(12) United States Patent
Honda

(10) Patent No.: US 7,272,784 B2
(45) Date of Patent: Sep. 18, 2007

(54) FORM PROCESSING METHOD, FORM PROCESSING PROGRAM, AND FORM PROCESSING APPARATUS

(75) Inventor: Kinya Honda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 10/889,637

(22) Filed: Jul. 12, 2004

(65) Prior Publication Data
US 2005/0015715 A1    Jan. 20, 2005

(30) Foreign Application Priority Data
Jul. 14, 2003  (JP) .............................. 2003-274006

(51) Int. Cl.
*G06F 17/00* (2006.01)
(52) U.S. Cl. ...................... 715/505; 715/504
(58) Field of Classification Search ................ 715/505, 715/530, 503, 504, 506, 507, 508
See application file for complete search history.

(56) References Cited

U.S. PATENT DOCUMENTS 6,549,878 B1 * 4/2003 Lowry et al. ............... 715/503
2001/0007988 A1 * 7/2001 Bauchot et al. ............. 707/100
2002/0188629 A1 * 12/2002 Burfoot ....................... 707/503
2003/0051209 A1 * 3/2003 Androski et al. ............ 715/503

FOREIGN PATENT DOCUMENTS

JP         2001-283140 A    10/2001

* cited by examiner

*Primary Examiner*—Stephen Hong
*Assistant Examiner*—Adam M. Queler
(74) *Attorney, Agent, or Firm*—Canon U.S.A, Inc. I.P. Division

(57) ABSTRACT

A form processing method edits at least one target field in a form. The form processing method determines the type of the form, determines whether an editing instruction is given to edit the target field interdependently with a related field relating to the target field, if the type of the form is a predetermined type of form, and edits the target field interdependently with the related field, if it is determined that the editing instruction is given to edit the target field interdependently with the related field.

8 Claims, 14 Drawing Sheets

FIG. 5

FORM FILE

BILL

| PRODUCT NAME | PRICE |
|---|---|
| KKK | XXXX |
| SUM | XXXX |

FIELD DATA

ORANGE 500
WATERMELON 1000
APPLE 300
PEACH 400
MELON 1500

OUTPUT

FIRST PAGE

BILL

| PRODUCT NAME | PRICE |
|---|---|
| ORANGE | 500 |
| WATERMELON | 1000 |

SECOND PAGE

| PRODUCT NAME | PRICE |
|---|---|
| APPLE | 300 |
| PEACH | 400 |

THIRD PAGE

| PRODUCT NAME | PRICE |
|---|---|
| MELON | 1500 |
| SUM | 3700 |

| ARTICLE NAME | AMOUNT OF MONEY |
|---|---|
| KKKKK | XXXXXXX |

| SUM | XXXXXXX |
|---|---|

| | ARTICLE NAME | AMOUNT OF MONEY |
|---|---|---|
| | KKKKK | XXXXXXX |

| | SUM | XXXXXXX |
|---|---|---|

STANDARD FORM

| NUMBER | ARTICLE NAME | AMOUNT OF MONEY |
|---|---|---|
| XXX | KKKKK | XXXXXXX |

DATA ROW → (row with XXX, KKKKK, XXXXXXX) ← DATA CELL

SUMMARY ROW → | SUM | XXXXXXX | ← SUMMARY CELL

CONVERT TABLE INTO GENERAL-PURPOSE FORM

GENERAL-PURPOSE FORM

| NUMBER | ARTICLE NAME | AMOUNT OF MONEY |
|---|---|---|
| XXX | KKKKK | XXXXXXX |
|  | SUM | XXXXXXX |

STANDARD FORM

| ARTICLE NAME | AMOUNT OF MONEY |
|---|---|
| KKKKK | XXXXXXX |

~DATA CELL

| SUM | XXXXXX | TAX INCLUDED | XXXXXXX |
|---|---|---|---|

SUMMARY CELL     SUMMARY CELL

CONVERT TABLE INTO GENERAL-PURPOSE FORM

GENERAL-PURPOSE FORM

| ARTICLE NAME | AMOUNT OF MONEY |
|---|---|
| KKKKK | XXXXXXX |

| SUM | XXXXXXX |
|---|---|

FORM PROCESSING METHOD, FORM PROCESSING PROGRAM, AND FORM PROCESSING APPARATUS

This application claims priority for Japanese Patent Application No. 2003-274006 filed Jul. 14,2003, which is incorporated hereby by reference.

BACKGROUND OF THE INVENTION

1. Field of the Invention

The present invention relates to a form processing method, a form processing program, and a form processing apparatus for use in editing forms.

2. Description of the Related Art

Heretofore, in order to output a form, data in a data file has been input into a predetermined field in a form file (standard template) indicating the layout of the form to create the output form. Such a method is disclosed in, for example, Japanese Unexamined Patent Application Publication No. 2001-283140.

A graphic indicating a field to which data is input is referred to herein as a field graphic, and data in a data file is referred to herein as field data.

A form including a table can be created by using such field graphics. However, there may be restrictions on the layout of fields in the form depending on the type of form (form file). Therefore, a user must be aware of the restrictions corresponding to the type of form in order to create a desired form. Such restrictions require a significant amount of time and effort of the user.

SUMMARY OF THE INVENTION

A form processing method, a form processing program, and a form processing apparatus, which are capable of easily editing fields (particularly, fields included in a table) in a form file in the editing of a form are disclosed.

According to an aspect of the present invention, a form processing method edits at least one target field in a form. The form processing method includes the steps of determining the type of the form; determining whether an editing instruction is given to edit the target field interdependently with a related field relating to the target field, if the type of the form is a predetermined type of form; and editing the target field interdependently with the related field, if it is determined that the editing instruction is given to edit the target field interdependently with the related field relating to the target field.

According to another aspect of the present invention, a form processing method edits at least one target field in a form. The form processing method includes the steps of determining whether an instruction is given to change the type of the form; determining whether the number of data cells in each data row to which field data is input is equal to the number of summary cells in a summary row where the field data input in the data cells is summed, if the instruction is given to change the type of the form to a predetermined type of form, the data calls and the summary cell being cells included in a table in the form; and converting the table such that the position of a split line of the summary row is aligned with the position of a corresponding split line of the data row, if it is determined that the number of data cells in the data row is equal to the number of summary cells in the summary row, and converting the table such that the number of summary cells in the summary row is matched with the number of data cells in the data row and such that the position of the split line of the summary row is aligned with the position of the corresponding split line of the data row, if it is determined that the number of data cells in the data row is not equal to the number of summary cells in the summary row.

According to another aspect of the present invention, a form processing program includes program code that causes a computer to edit at least one target field in a form. The computer code includes the steps of determining the type of the form; determining whether an editing instruction is given to edit the target field interdependently with a related field relating to the target field, if the type of the form is a predetermined type of form; and editing the target field interdependently with the related field if it is determined that the editing instruction is given to edit the target field interdependently with the related field.

According to another aspect of the present invention, a form processing program includes program code that causes a computer to edit at least one target field in a form. The computer code includes the steps of determining whether an instruction is given to change the type of the form; determining whether the number of data cells in each data row to which field data is input is equal to the number of summary cells in a summary row where the field data input in the data cells is summed, if the instruction is given to change the type of the form to a predetermined type of form, the data calls and the summary cell being cells included in a table in the form; and converting the table such that the position of a split line of the summary row is aligned with the position of a corresponding split line of the data row, if it is determined that the number of data cells in the data row is equal to the number of summary cells in the summary row, and converting the table such that the number of summary cells in the summary row is matched with the number of data cells in the data row and such that the position of the split line of the summary row is aligned with the position of the corresponding split line of the data row, if it is determined that the number of data cells in the data row is not equal to the number of summary cells in the summary row.

According to another aspect of the present invention, a form processing apparatus is configured to edit at least one target field in a form. The form processing apparatus includes a form determining unit configured to determining the type of the form; a determining unit configured to determine whether an editing instruction is given to edit the target field interdependently with a related field relating to the target field, if the type of the form is a predetermined type of form; and an editing unit for editing the target field interdependently with the related field, if it is determined that the editing instruction is given to edit the target field interdependently with the related field relating to the target field.

According to another aspect of the present invention, a form processing apparatus is configured to edit at least one target field in a form. The form processing apparatus includes a form determining unit configured to determine whether an instruction is given to change the type of the form; a number-of-cells determining unit configured to determine whether the number of data cells in each data row to which field data is input is equal to the number of summary cells in a summary row where the field data input in the data cells is summed, if the instruction is given to change the type of the form to a predetermined type of form, the data calls and the summary cell being cells included in a table in the form; and a converting unit configured to convert the table such that the position of a split line of the summary row is aligned with the position of a corresponding split line of the data row, if it is determined that the number of data cells in the data row is equal to the number of summary cells in the summary row, and for converting the table such that the number of summary cells in the summary row is matched with the number of data cells in the data row and such that the position of the split line of the summary row is aligned with the position of the corresponding split line of the data row, if it is determined that the number of data cells in the data row is not equal to the number of summary cells in the summary row.

According to the present invention, it is possible for a user to perform editing without being aware of whether his editing instructions conform to the format (restrictions) corresponding to the type of a form, thus allowing the user to efficiently editing the form.

Further features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates an example of generating an output form including a table.

DESCRIPTION OF THE EMBODIMENTS

Figure 1:
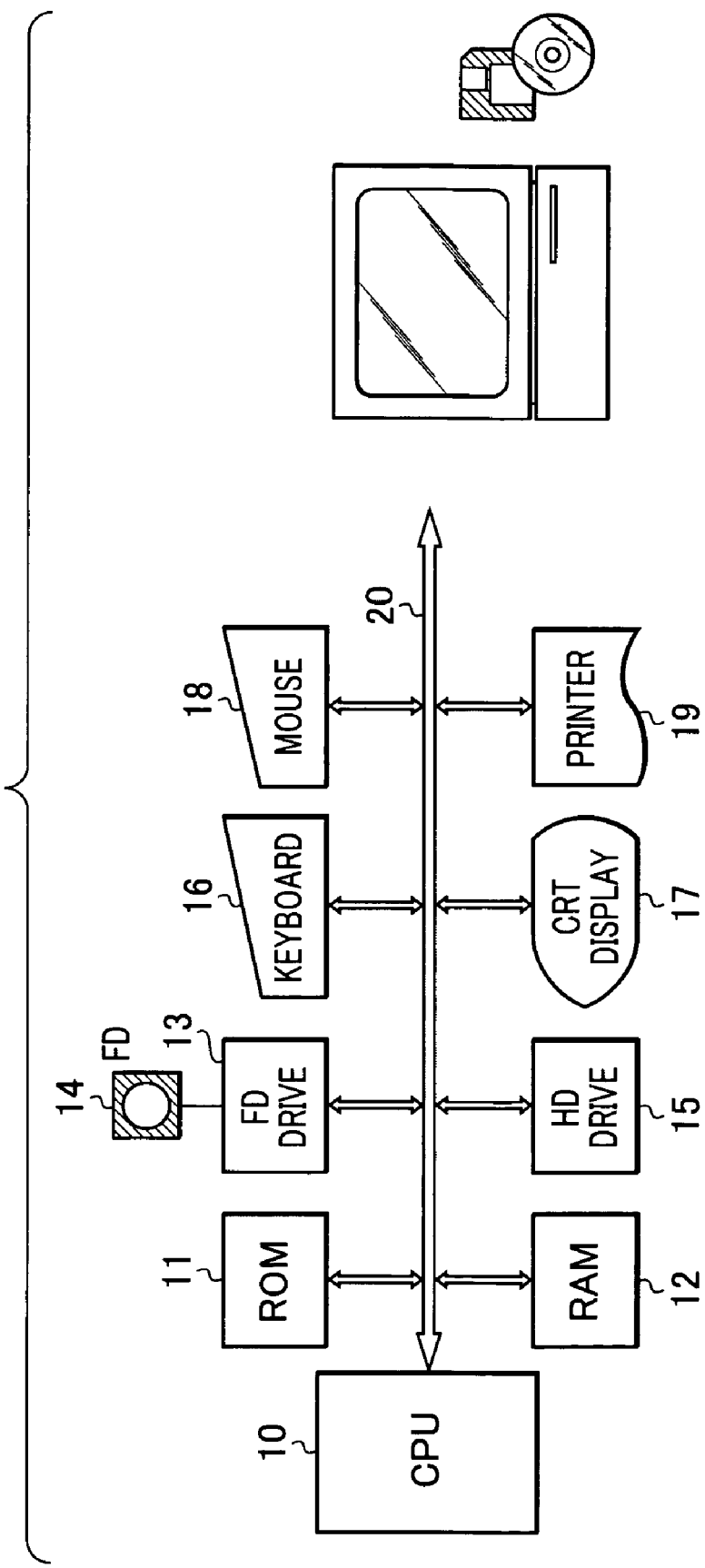
FIG. 1 is a block diagram showing an exemplary hardware configuration of a form processing system according to an embodiment of the present invention.

FIG. 1 is a block diagram showing an exemplary hardware configuration of a form processing system (form processing apparatus) according to an embodiment of the present invention. The form processing system is a computer system that includes a central processing unit (CPU) 10; a main memory including a ROM 11 and a random-access memory (RAM) 12; an external memory including a floppy disk (FD) drive 13 and a hard disk (HD) drive 15; an instruction input device including a pointing device (coordinate indicating device), such as a mouse 18, and a keyboard 16; a display device such as a cathode ray tube (CRT) display 17; a printing device, such as a printer 19 or a plotter; and a system bus 20 connecting the above components. The form processing system is connected to other computer systems via communication lines, for example, a network. The form processing system may be embodied by using an information processor, such as a general workstation or a personal computer.

The CPU 10 executes a basic input-output program, an operating system (OS), and a form processing program to activate the form processing system. The basic input-output program is written in the ROM 11 and the OS is written in the HD drive 15. When the form processing system is turned on, the OS is read from the HD drive 15 and read into the RAM 12 by an initial program loading (IPL) function included in the basic input-output program to start the OS operation.

Figure 2:
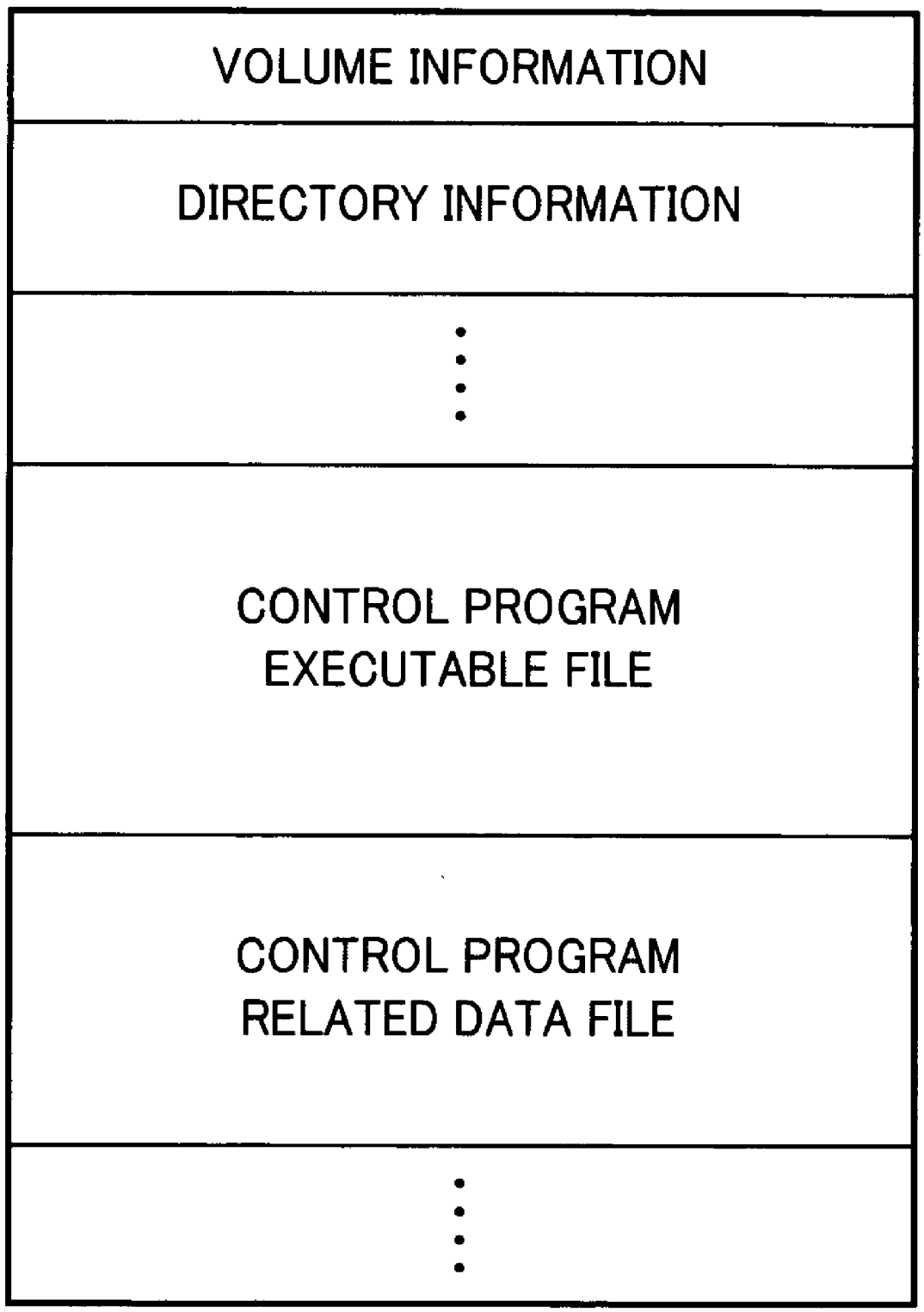
FIG. 2 is a diagram showing the contents of a floppy disk (FD).
Figure 3:
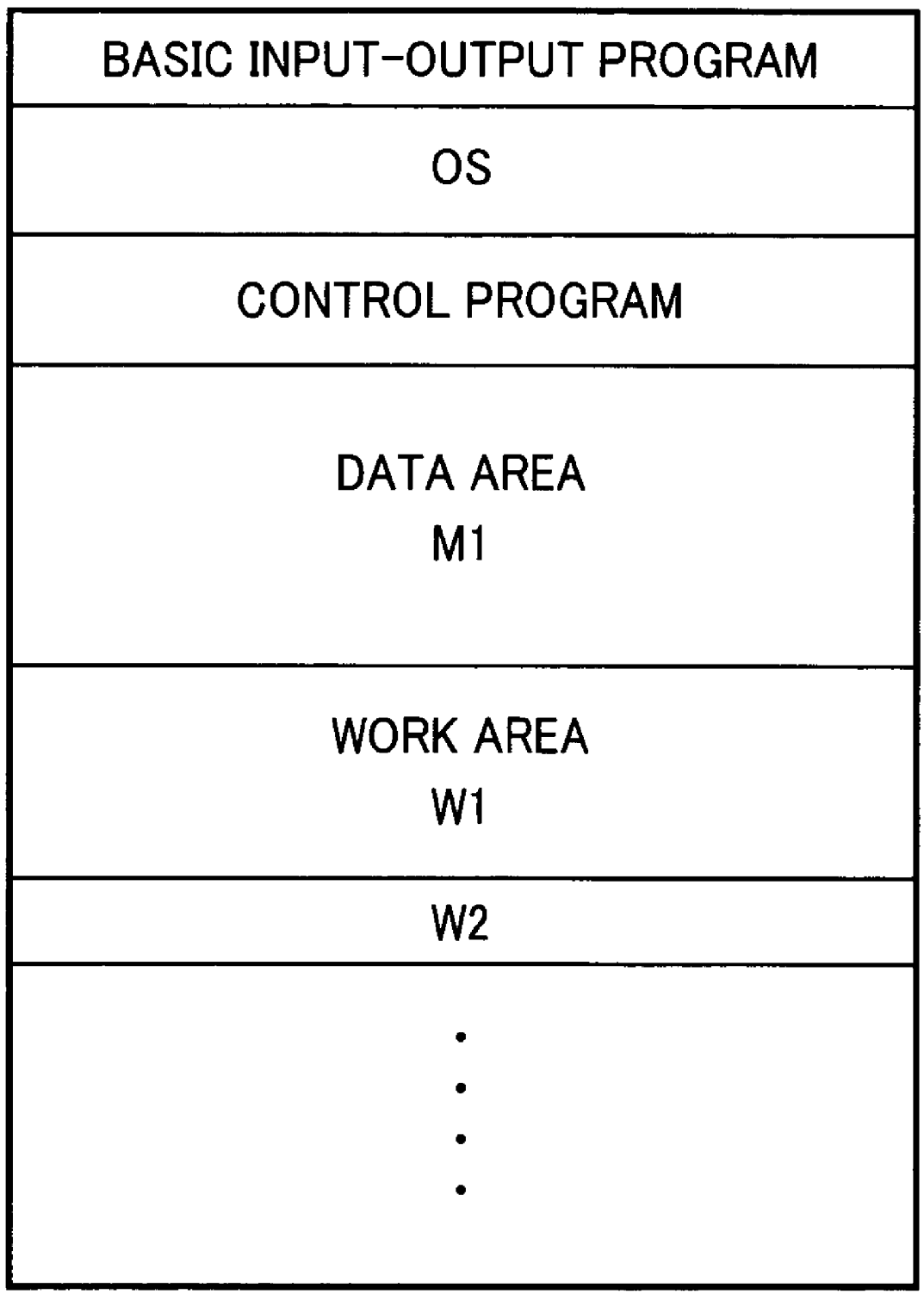
FIG. 3 is a diagram showing a memory map in a state where a control program loaded in a read-only memory (ROM) is executable.

The control program (the form processing program) for realizing the form processing system of this embodiment and related data are recorded in an FD 14. FIG. 2 is a diagram showing the contents of the FD 14. The control program executable file and the control program related data recorded in the FD 14 are loaded into the computer system through the FD drive 13, as shown in FIG. 1. When the FD 14 is inserted in the FD drive 13, the control program and related data are read out from the FD 14 and are loaded into the RAM 12 under the control of the OS and the basic input-output program. The control program is then made ready for operating. FIG. 3 is a diagram showing the memory map in a state where the control program loaded in the RAM 12 is executable.

Although the control program and related data are read out from the FD 14 and are directly loaded into the RAM 12 in this embodiment, the control program and related data may be stored (installed) in the HD drive 15 in advance and may be read out from the HD drive 15 and loaded into the RAM 12 for operating the control program. The control program may be recorded in a removable storage medium, such as a compact disc read-only memory (CD-ROM) or an integrated circuit (IC) memory card, instead of the FD 14. Alternatively, the control program may be recorded in the ROM 11 as part of the memory map and may be directly executed by the CPU 10. Furthermore, the control program may be read from another device via a network to be executed.

First Embodiment

Figure 4:
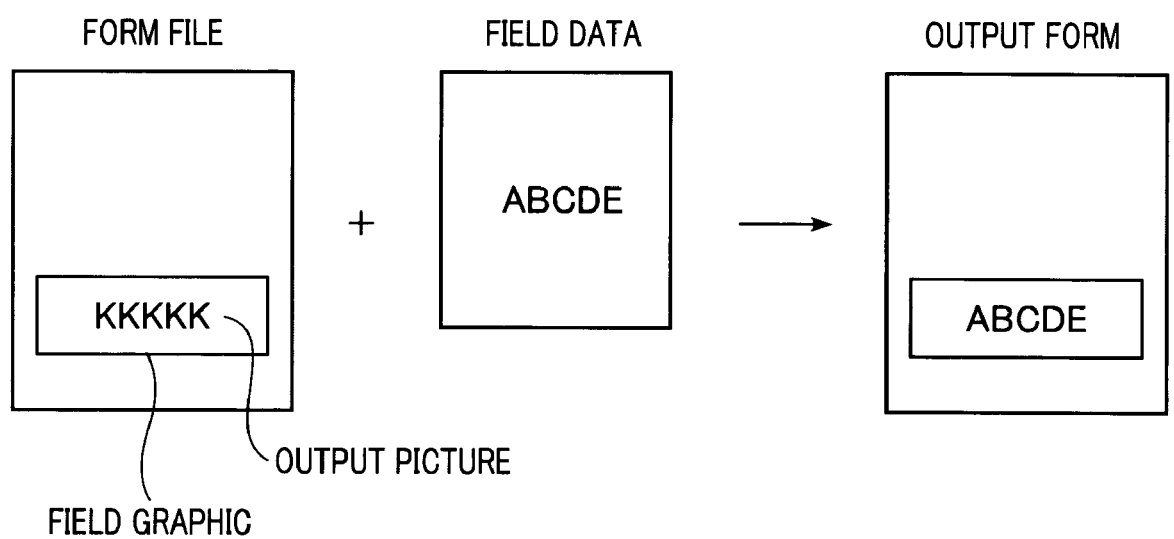
FIG. 4 illustrates an example of inputting field data in a field in a form file to generate an output form, according to a first embodiment of the present invention.

FIG. 4 illustrates an example of inputting field data in a field in a form file to generate an output form, according to a first embodiment of the present invention. It is assumed that the output form of the input field data can be specified for each field graphic (specification of output format). Alphabetic characters used for specifying the output form are called output pictures. For example, when "K" is an output picture for specifying that only one alphabetic character is output, not numeric values but alphabetic characters are output from among the input field data. In addition, when five "Ks" are specified, as shown in FIG. 4, field data including up to five alphabetic characters can be output in the corresponding field graphic.

According to the first embodiment, a form including a table having a variable size can be created, as shown in FIG. 5. In other words, it is possible to create a form in which the number of rows in a table can be varied depending on the amount of data in the field data. If the table cannot be fit on one page, the table covers a plurality of pages. It is also possible to display the calculation result, such as the sum of the values in a column, by editing the table.

Figure 6:
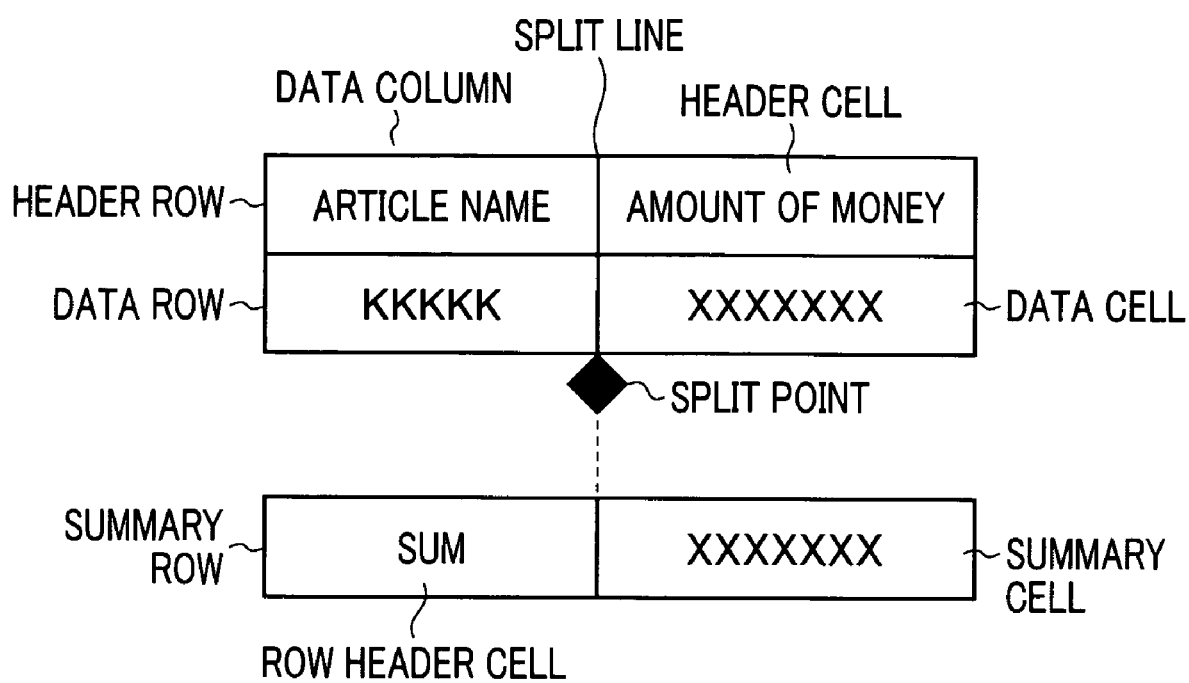
FIG. 6 illustrates an example of editing a form file including a table.

FIG. 6 illustrates an example of editing a form file including a table. A mode for use in editing a table is hereinafter referred to as a table editing mode. Headers, each being displayed at the top of the corresponding column in the table, are set in a header row in FIG. 6. A user can arbitrarily change the contents of each header cell, such as "article name". Data read from the field data is input in a data row. A plurality of data rows are created depending on the amount of data. Table cells in which the field data is input by using the field graphics are set in data cells. The calculation results of the data cells, such as the sum of the values in the data cells, are displayed in the summary row. The user sets in advance the type(s) of calculation(s) for the data cells in the summary row. Lines for splitting the cells from each other are called split lines. The number of columns or rows in a table can be arbitrarily set by the user. Alphabetic strings including "K" and "X" in FIG. 6 are output pictures. The output picture "K" denotes an alphabetic character and the output picture "X" denotes a numeral. The number of "Ks" and "Xs" determine the number of output characters and the number of digits, respectively.

A form file may have a version designed for increasing the processing speed or achieving multiplatform operation, in addition to a standard version. Such a form file is hereinafter referred to as a general-purpose form, in contrast to a standard form for the standard version. However, the general-purpose form is restricted in its function compared with the standard form.

With the standard form, the summary cells can be edited separately from the data cells to create a table. In contrast, with the general-purpose form, restrictions apply to the summary cells and the data cells. For example, the widths of the summary cells must be equal to those of the corresponding data cells, or the number of data columns must be equal to the number of summary columns.

Such restrictions have heretofore caused a problem in that the user had to always be aware of whether the standard form or the general-purpose form was being used in editing a table. In addition, the user had to re-edit the table in order to convert the table from the standard form to the general-purpose form, thus requiring a lot of time and effort.

According to the first embodiment, it is determined whether the form to be edited is the standard form or the general-purpose form. If the general-purpose form is to be edited, the data cells and the summary cells are edited interdependently.

Figure 7:
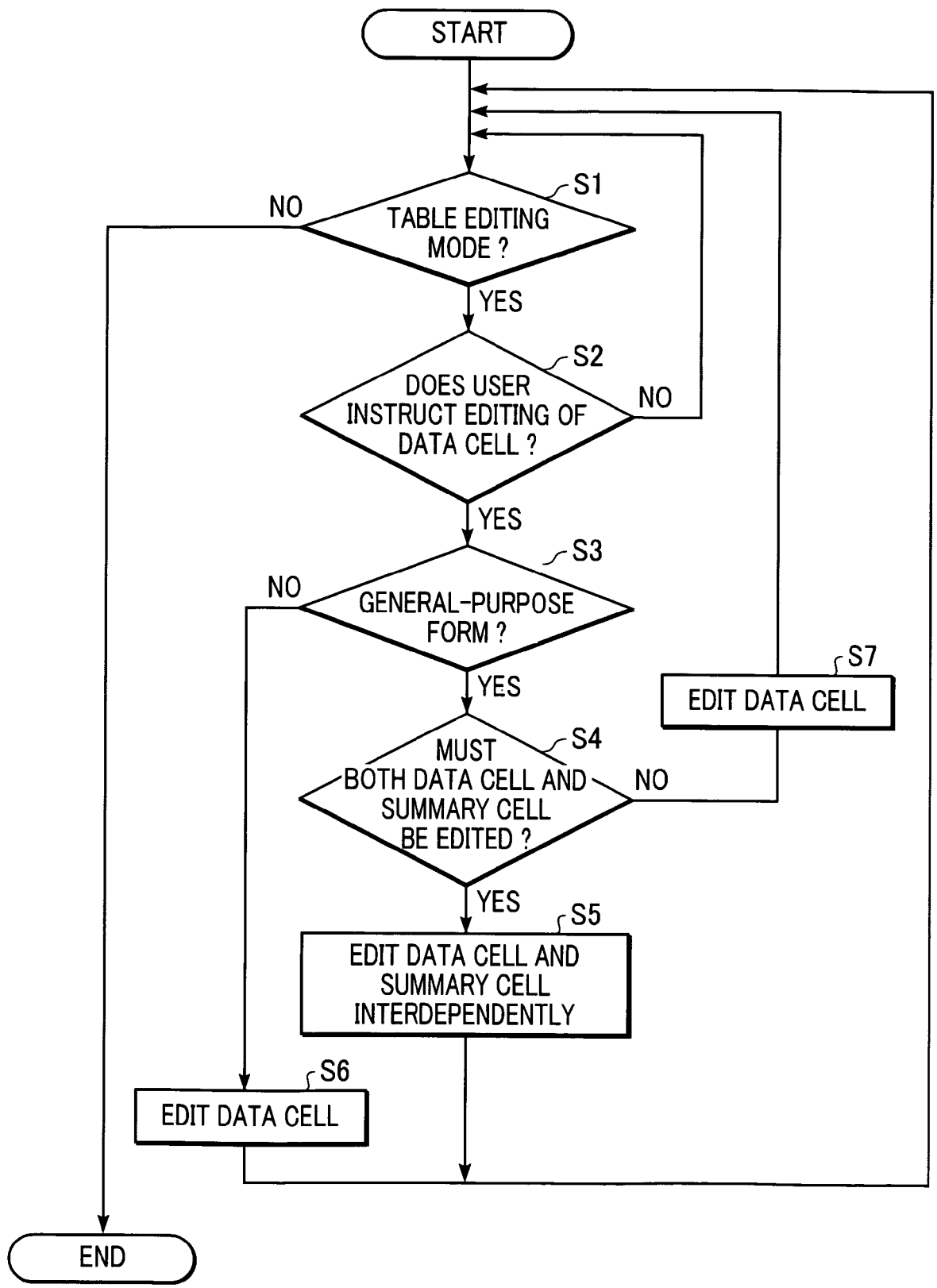
FIG. 7 is a flowchart showing a process of editing a table according to the first embodiment.

FIG. 7 is a flowchart showing a process of editing a table according to the first embodiment.

In Step S1, the process determines whether a form is edited in the table editing mode.

If the form is not edited in the table editing mode, processing of FIG. 7 ends. However, if the form is edited in the table editing mode, processing proceeds to Step S2 and the process determines whether a user instructs editing of the data cells.

Figure 8:
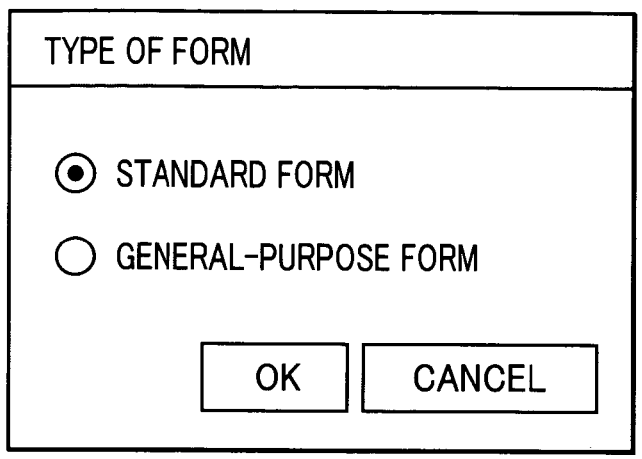
FIG. 8 is a diagram showing a dialog box for selecting a type of form.

If it is determined that the user did not instruct editing of the data cells, processing returns to Step S1. However, if it is determined that the user instructs editing of the data cells, processing proceeds to Step S3 and the process determines whether the current form is the standard form or the general-purpose form. It is assumed that the standard form or the general-purpose form has been set in advance at the start of creation of the form or the like. For example, the standard form or the general-purpose form may be set by using a dialog box, as shown in FIG. 8.

If the process determines in Step S3 that the current form is the general-purpose form, in Step S4, the process determines whether both the data cells and the summary cells must be edited by using the general-purpose form in response to an editing instruction from the user.

If both the data cells and the summary cells must be edited by using the general-purpose form (for example, if the size of the data cells is to be changed), in Step S5, the data cells and the summary cells are edited interdependently in accordance with the editing instruction from the user. Processing then returns to Step S1.

If the process determines in Step 4 that the data cells and the summary cells are not required to be edited interdependently (for example, if the number of output pictures in the data cells is to be changed), in Step S7, the corresponding data cells are edited. Processing then returns to Step S1.

If the process determines in Step S3 that the current form is the standard form, in Step S6, the data cells are edited in accordance with the editing instruction. In Step S6, the data cells are edited whereas the summary cells are not edited interdependently with the editing of the data cells. Processing then returns to Step S1.

Figure 9:
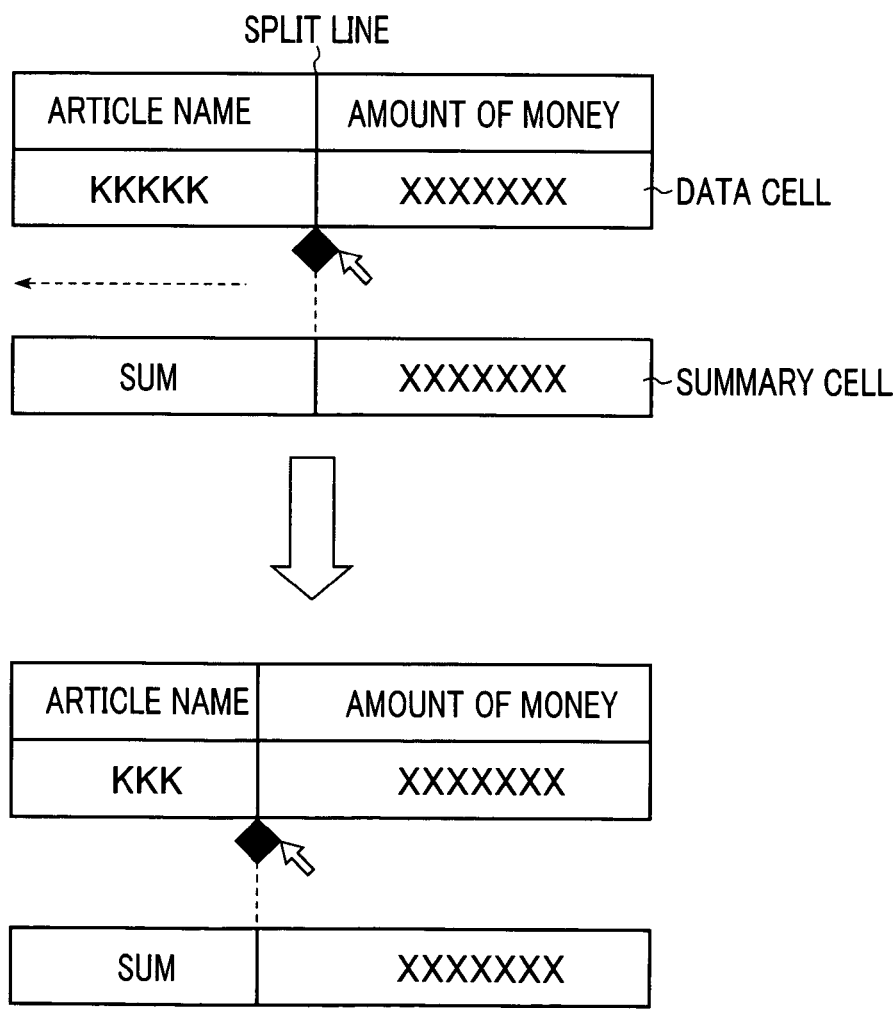
FIG. 9 illustrates an example in which data rows and a summary row are edited interdependently.
Figure 10:
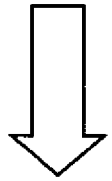
FIG. 10 illustrates another example in which data rows and the summary row are edited interdependently.

Exemplary changes in the user interface corresponding to Steps S1 to S5 are shown in FIGS. 9 and 10.

FIG. 9 is a diagram illustrating the operation of changing the width of data cells when the general-purpose form is specified. The process determines that the width of the data cells is to be changed based on a click-and-drag operation on a split line or a split point and that the data cells and the summary cells must be edited interdependently in order to meet the restrictions on the general-purpose form. In this case, the width of the summary cells is automatically changed interdependently with the change of the width of the data cells.

FIG. 10 is a diagram illustrating the operation of adding data cells when the general-purpose form is specified. When the user instructs addition of data cells, the process determines that the data cells and the summary cells must be edited interdependently in order to meet the restrictions on the general-purpose form. In this case, summary cells are automatically added interdependently with the addition of the data cells. Furthermore, summary cells are automatically deleted interdependently with the deletion of the data cells.

As described above, when the general-purpose form is specified, the process automatically determines in Step S4 whether both the data cells and the summary cells must be edited interdependently in response to the editing instruction from the user. Accordingly, it is not necessary for the user to be aware of whether the instructions conform to the format of the general-purpose form.

Although cases where the summary cells are automatically edited interdependently with the editing of the data cells are illustrated in FIGS. 9 and 10, the data cells may be automatically edited interdependently with the editing of the summary cells.

Second Embodiment

The data cells and the summary cells are edited interdependently in the first embodiment. In contrast, according to a second embodiment of the present invention, a process of converting from the standard form to the general-purpose form, when the standard form is specified and the format of the data cells are set differently from the format of the summary cells is described next.

In order to convert the table from the standard form to the general-purpose form, the table must meet the restrictions of the general-purpose form. According to the second embodiment, since the table is automatically converted to meet the restrictions of the general-purpose form when the table is converted from the standard form to the general-purpose form, the need for the user to manually re-edit the table is eliminated, thus lightening the burden on the user.

Figure 11:
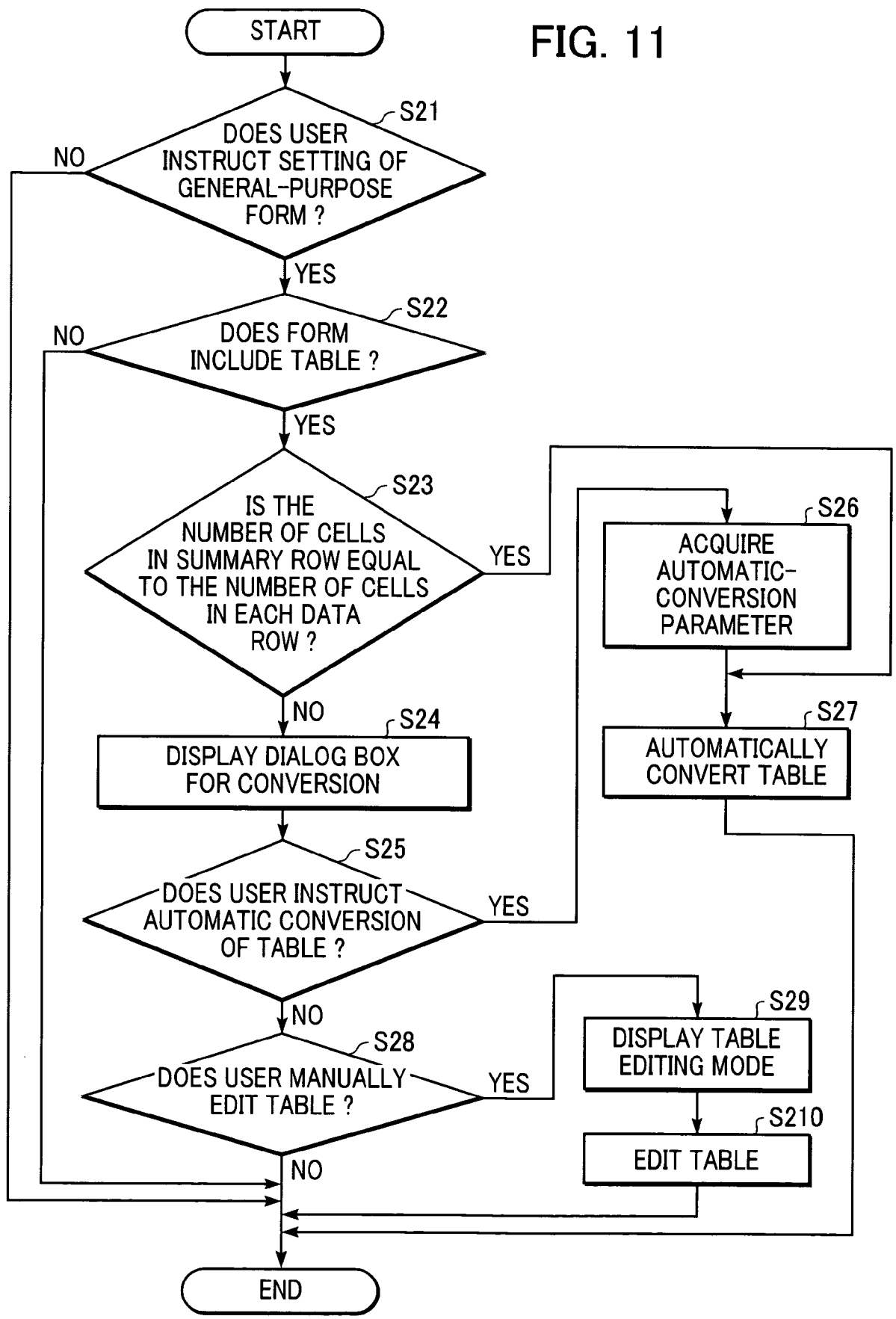
FIG. 11 is a flowchart showing a process of converting a table according to a second embodiment.

FIG. 11 is a flowchart showing a process of converting a table according to the second embodiment.

In Step S21, the process determines whether a user instructs setting of the general-purpose form.

If it is determined that the user did not instruct setting of the general-purpose form, processing of FIG. 11 ends. However, if it is determined that the user instructed setting of the general-purpose form, processing proceeds to Step S22 and the process determines whether the general-purpose form includes a table.

If it is determined that the general-purpose form does not include a table, processing of FIG. 11 ends. However, if it is determined that the general-purpose form includes a table, processing proceeds to Step S23 and the process determines whether the number of cells in the summary row is equal to the number of cells in each data row in the table.

Figure 12:
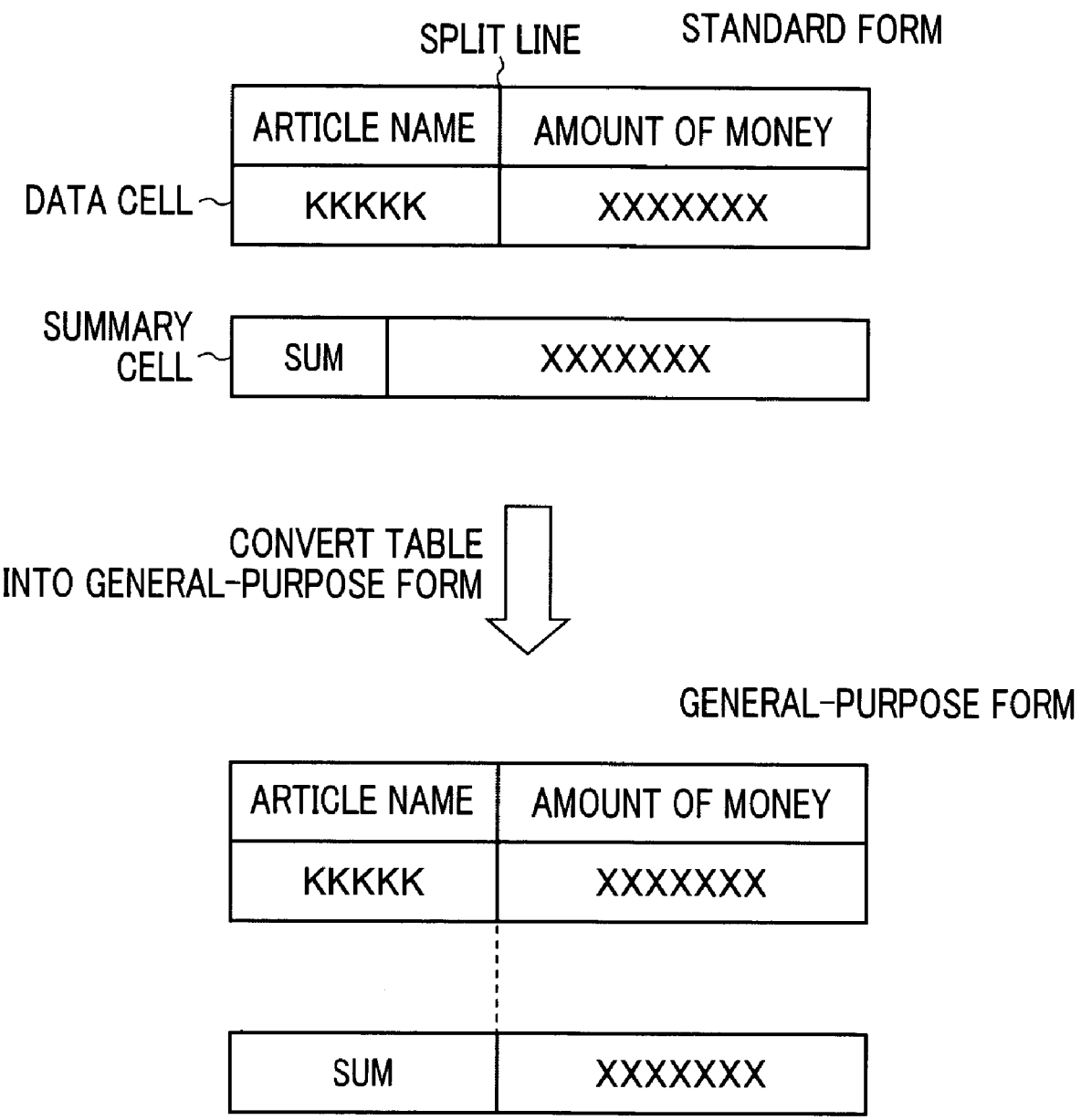
FIG. 12 illustrates an example in which a table is automatically converted into a general-purpose form.

If it is determined that the number of cells in the summary row is equal to the number of cells in each data row in the table, in Step S27, the process automatically aligns the split lines of the summary row with the corresponding split lines of the data rows. FIG. 12 is a diagram illustrating the operation of aligning a split line of the summary row with a split line of the data rows in response to the instruction to convert into the general-purpose form when the position of the split line of the summary row is shifted from the position of the split line of the data rows. With this operation, the table can be smoothly converted from the standard form to the general-purpose form even if a user does not manually edit the table. Referring back to FIG. 11, after automatically converting the table (Step S27), processing of FIG. 11 ends.

Figure 13:
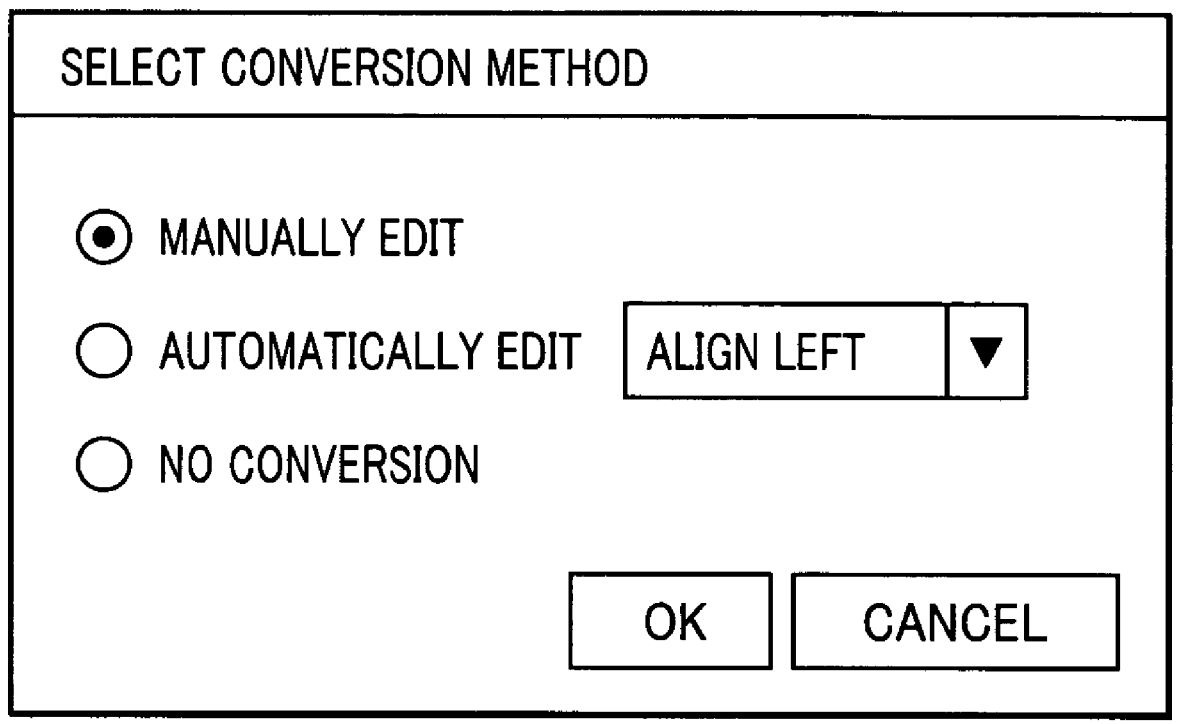
FIG. 13 illustrates a dialog box in which a user can select a method of converting a table into a general-purpose form.

If the process determines in Step S23 that the number of cells in the summary row is not equal to the number of cells in each data row, in Step S24, for example, the process displays a dialog box as shown in FIG. 13 where the user can select the method of converting the table to the general-purpose form. In the dialog box in FIG. 13, the user can select a mode in which the number of cells in the table is manually edited, a mode in which the table is automatically converted into the general-purpose form, or a mode in which the conversion into the general-purpose form is not performed. Parameters for aligning the current table right, aligning the current table left, and so on may be set for the mode where the table is automatically converted into the general-purpose form.

In Step S25, the process determines whether the user instructs automatic conversion of the table into the general-purpose form.

If the process determines that the user instructs automatic conversion of the table into the general-purpose form, in Step S26, the process acquires one of the automatic-conversion parameters specified in Step S24.

Figure 14:
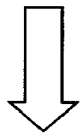
FIG. 14 illustrates another example in which a table is automatically converted into a general-purpose form.
Figure 15:
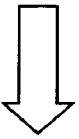
FIG. 15 illustrates still another example in which a table is automatically converted into a general-purpose form.

In Step S27, the table is automatically converted into the general-purpose form. FIGS. 14 and 15 illustrate examples of the automatic conversion.

FIG. 14 illustrates an example in which the number of cells in the summary row is less than the number of cells in each data row. In this case, converting the table into the general-purpose form automatically adds a new cell to the summary row. The new cell is added to the leftmost side of the summary row when the parameter for aligning the current table right is specified, whereas the new cell is added to the rightmost side of the summary row when the parameter for aligning the current table left is specified.

FIG. 15 illustrates an example in which the number of cells in the summary row is greater than the number of cells in each data row. In this case, converting the table into the general-purpose form automatically deletes cells from the summary row, so that the number of cells in the summary row becomes equal to the number of cells in each data row. Referring to FIG. 15, two right-hand cells are deleted and two left-hand cells remain when the parameter for aligning the current table left is specified, whereas the two left-hand cells are deleted and the two right-hand cells remain when the parameter for aligning the current table right is specified.

The table of the standard form can be automatically converted into the table of the general-purpose form in this manner, thus lightening the burden on the user.

Referring back to FIG. 11, if the process determines in Step S25 that the user does not instruct automatic conversion of the table into the general-purpose form, in Step S28, the process determines whether the user manually edits the table.

If the process determines that the user does not automatically edit the table, processing of FIG. 11 ends. On the other hand, if the process determines that the user manually edits the table, in Step S29, the process displays the table editing mode and, then in Step S210, the user edits the table. Accordingly, the edit screen is smoothly displayed even when the user wants to edit the table not automatically but manually. Processing of FIG. 11 then ends.

As described above, according to the present invention, it is possible to efficiently edit or convert the table in the creation or editing of a form.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A form processing method for editing a target form, in an information processing apparatus storing a non-restriction type of form which does not include restrictions for editing of fields in the form and a restriction type of form which includes restrictions for editing of fields in the form, comprising:
   determining a type of the form of the target form;
   determining whether an editing instruction is given to edit a target field interdependently with a related field relating to the target field;
   applying the editing instruction to the target field if it is determined that the target form is the non-restriction type of form; and
   applying the editing instruction to the target field and the related field if it is determined that the editing instruction is given to edit the target field interdependently with the related field and it is determined that the form of editing target is the restriction type of form.

2. The form processing method according to claim 1, wherein the target field is a cell included in a table in the form and the table has at least one row.

3. The form processing method according to claim 2, wherein the target field is a data cell to which field data is input, and the related field is a summary cell where the field data input in the data cell for each of the rows in the table is summed.

4. The form processing method according to claim 3, wherein, if it is determined that the editing instruction is given to edit the target field interdependently with the related field and the editing instruction is an instruction to change a width of the data cell, the width of the data cell is changed interdependently with the width of the summary cell.

5. The form processing method according to claim 3, wherein, if it is determined that the editing instruction is given to edit the target field interdependently with the related field and the editing instruction is an instruction to add at least one data cell, the data cell is added interdependently with a corresponding summary cell.

6. The form processing method according to claim 3, wherein, if it is determined that the editing instruction is given to edit the target field interdependently with the related field and the editing instruction is an instruction to delete at least one data cell, the data cell is deleted interdependently with at least one corresponding summary cell.

7. A form processing program stored on a computer-readable medium and including program code that causes a computer storing a non-restriction type of form which does not include restrictions for editing fields in the form and a restriction type of form which includes restrictions for editing of fields in the form to perform the form processing program, the program code comprising the steps of:

determining a type of the form of editing target;
 determining whether an editing instruction is given to edit a target field interdependently with a related field relating to the target field;
 applying the editing instruction to the target field if it is determined that the form of editing target is the non-restriction type of form; and
 applying the editing instruction to the target field and the related field if it is determined that the editing instruction is given to edit the target field interdependently with the related field and it is determined that the form of editing target is the restriction type of form.

8. A form processing apparatus storing a non-restriction type of form which does not include restrictions for editing of fields in the form and a restriction type of form which includes restrictions for editing of fields in the form, the form processing apparatus comprising:

a processor configured to
 determine a type of form of editing target,
 determine whether an editing instruction is given to edit a target field interdependently with a related field relating to the target field; and
 apply the editing instruction to the target field if it is determined that the form of editing target is the non-restriction type of form, and to apply the editing instruction to the target field interdependently with the related field if it is determined that the editing instruction is given to edit the target field interdependently with the related field relating to the target field and it is determined that the form of editing target is the restriction type of form.

* * * * *